(12) United States Patent
Forsberg, Jr. et al.

(10) Patent No.: US 6,847,403 B1
(45) Date of Patent: Jan. 25, 2005

(54) INTEGRATED PORTABLE VIDEOCONFERENCING UNIT

(75) Inventors: Roy W. Forsberg, Jr., Nashua, NH (US); Alan M. Rock, Boxborough, MA (US); Andrew H. Nilssen, Framingham, MA (US); Dennis S. Kallelis, Salem, MA (US); Mark R. Duckworth, Merrimack, NH (US)

(73) Assignee: Polycom, Inc., Pleasanton, CA (US)

( * ) Notice: Subject to any disclaimer, the term of this patent is extended or adjusted under 35 U.S.C. 154(b) by 0 days.

(21) Appl. No.: 08/964,324

(22) Filed: Nov. 5, 1997

(51) Int. Cl.$^7$ .................. H04N 5/225; H04N 5/232; H04N 7/14; H04N 7/16
(52) U.S. Cl. ............... 348/373; 348/14.04; 348/211.12; 725/139
(58) Field of Search ................. 348/373, 374, 348/375, 14.01–14.16, 211.12, 211.13, 207.1, 207.11; 725/110, 139, 140, 141

(56) References Cited

U.S. PATENT DOCUMENTS

| | | | | |
|---|---|---|---|---|
| 5,303,042 A | * | 4/1994 | Lewis et al. ............. 348/14.01 |
| 5,332,031 A | * | 7/1994 | Kiga ..................... 165/86 |
| 5,463,432 A | * | 10/1995 | Kahn ..................... 352/243 |
| 5,583,927 A | * | 12/1996 | Ely et al. ................ 379/207 |
| 5,634,144 A | * | 5/1997 | Mauro et al. ............. 396/57 |
| 5,636,286 A | * | 6/1997 | Makabe et al. ........... 381/71.5 |
| 5,654,961 A | * | 8/1997 | Araujo et al. ........... 348/14.11 |
| 5,689,300 A | * | 11/1997 | Shibata et al. ........... 348/15 |
| 5,793,367 A | * | 8/1998 | Taguchi .................. 348/15 |
| 5,793,415 A | * | 8/1998 | Gregory, III et al. ..... 348/15 |
| 5,802,281 A | * | 9/1998 | Clapp et al. ............ 709/228 |
| 5,821,987 A | * | 10/1998 | Larson ................. 348/14.15 |
| 5,940,074 A | * | 8/1999 | Britt et al. ............. 345/749 |
| 5,959,667 A | * | 9/1999 | Maeng .................. 348/14.08 |
| 5,999,207 A | * | 12/1999 | Rodriguez et al. .......... 348/14 |
| 5,999,965 A | * | 12/1999 | Kelly .................... 709/202 |
| 6,034,715 A | * | 3/2000 | Ishida et al. ............ 348/14.01 |
| 6,046,762 A | * | 4/2000 | Sonesh et al. ........... 348/14.11 |
| 6,091,777 A | * | 7/2000 | Guetz et al. ........... 375/240.11 |
| 6,094,219 A | * | 7/2000 | Roberts et al. ........... 348/207 |
| 6,118,902 A | * | 9/2000 | Knowles ................. 382/240 |
| 6,121,998 A | * | 9/2000 | Voois et al. ............ 348/14.13 |
| 6,124,882 A | * | 9/2000 | Voois et al. ............ 348/14.08 |
| 6,128,033 A | * | 10/2000 | Friedel et al. ........... 348/14.04 |
| 6,215,515 B1 | * | 4/2001 | Voois et al. ............ 348/14.01 |
| 6,215,731 B1 | * | 4/2001 | Smith ................... 367/128 |

* cited by examiner

*Primary Examiner*—Wendy R. Garber
*Assistant Examiner*—John M. Villecco
(74) *Attorney, Agent, or Firm*—Wong, Cabello, Lutsch, Rutherford & Brucculeri, L.L.P.

(57) ABSTRACT

A portable integrated videoconferencing unit has an integral housing in which an interior chamber houses an electronics board for performing video, audio, and communications processing. Integrally mounted on the housing are a video camera and preferably a microphone array for providing directive audio processing. The electronics board receives and processes video and audio outputs of the camera and microphone array respectively, and generates compressed video and audio outputs for transmission over the communications channel. The electronics board also receives compressed video conferencing signals from the channel and processes those signals to generate the appropriate video and audio signals for connection to a video monitor. Various elements are isolated from the microphones to reduce noise and vibration, and an answer bar can be mounted on the integrated unit to provide an easy known answer capability where an automatic answering mode is not desired. The software of the unit can be upgraded during a videoconference call with an upgrade server.

14 Claims, 9 Drawing Sheets

INTEGRATED PORTABLE VIDEOCONFERENCING UNIT

BACKGROUND OF THE INVENTION

The invention relates generally to videoconferencing systems, and more particularly, to a portable, easy to set up, videoconferencing system.

Videoconferencing systems operating over the public telephone network have existed commercially for about ten years. The systems can be divided into two primary classes, a group or conference room class of system and a desktop class of system. Traditionally, the group systems are relatively large, freestanding systems shipped in several crates and including, typically separately, an electronics unit containing the coder and decoder (codec), a camera for placement in the conference room, a microphone for placement in the room, and a remote control, either wired or wireless (infrared) for controlling the system.

Desktop systems are typically shipped to the customer in one or more packages and contain one or two electronics boards to install in a personal computer, software to load into the computer, a microphone with a cable to attach to the computer, and a camera with a cable to attach to the computer. Thus, desktop systems operate in conjunction with a personal computer and while they can be moved, are not what is commonly called portable, such as a portable laptop.

SUMMARY OF THE INVENTION

In accordance with the invention, there is provided a portable videoconferencing system having the elements of a videoconferencing system, including the codec, the camera, and the microphone, and which is integrated into a single unit and packaged in a form factor so that the user can easily carry the system to different locations. The system preferably weights less than 20 pounds, and can be packaged, for example, in a reusable container, briefcase or suitcase, that allows a user to carry the system, by hand, from room to room, or building to building, and in a car, train, or plane. This system is preferably designed to facilitate easy unpacking and repacking, and the carrying container with a handle, allows the user to carry the system from point to point.

The invention thus relates to a portable, integrated videoconferencing unit and features an integral housing having an electronics containing interior chamber, an electronics board contained within the chamber, the electronics board performing at least video and audio processing, a video camera integrally mounted on the housing and having a video output connected to the electronics board, at least one microphone mounted on the housing having an audio output connected to the electronics board, the electronics board receiving and processing the video and audio outputs and generating a compressed video output signal and a compressed audio output signal for transmission over a communications channel. The electronics board further features receiving videoconferencing signals, representing compressed video and audio, from the communications channel, and decompressing the compressed video and audio from the videoconferencing signals received from the channel to generate decompressed far end audio and video signals. The videoconferencing unit further features a video connection integral with the housing for enabling an electrical access to at least the decompressed video signals, and a channel connection integral with a housing for enabling an electrical connection to the communications channel.

In particular embodiments of the invention, the camera is designed to be a very low noise, preferably worm drive driven camera to provide tilt and pan movement while maintaining a silent running profile. In this manner, the microphones integral with the housing are not adversely affected by camera movement.

In a similar aspect, a fan for air cooling the unit is mounted in the interior of the unit between two substantially airtight compartments. The fan moves air from one compartment to the other. The compartments are configured to provide appropriate cooling for the necessary electronics within the housing, and each compartment has openings to ambient air, one compartment for receiving ambient air and the other compartment for providing air from the interior of the housing to the outside environment.

The videoconferencing unit further features an answer actuation device integral with the housing and mounted with an exterior access. The activation device is connected to the electronics board, and said the electronics board, in response to activation of the device, answers an incoming video conference call.

The portable integrated teleconferencing unit further has a size and profile so that it can be stably positioned on top of a video monitor, and can be carried easily from location to location. The unit preferably weighs less than 20 pounds, and more particularly less than 15 pounds.

In particular aspects of the invention, the microphone is a directional microphone array having at least three microphones and circuitry, associated with the electronics board for operating the array. In another preferred aspect of the invention, a remote infrared communications system enables a user, distanced from the videoconferencing unit, to remotely control the unit.

In another aspect, the invention relates to a method for upgrading the software which controls the videoconferencing unit. The method features the steps of placing a videoconferencing call to a software upgrade server, answering and establishing the videoconference call, requesting, by the videoconferencing unit, a software upgrade procedure, sending, from the videoconferencing unit, an identification of the unit, verifying at the software upgrade server, the identity of and any software available to the videoconferencing unit, upgrading, within and during the videoconferencing call, the software at the videoconferencing unit based upon the resources found to be available to the unit, and completing the videoconferencing call after the upgrade is completed, without further operations being required from the videoconferencing unit.

BRIEF DESCRIPTION OF THE DRAWINGS

Other objects, features, and advantages of the invention will be apparent from the following description taken together with the drawings in which.

DESCRIPTION OF A PARTICULAR PREFERRED EMBODIMENT

Figure 1:
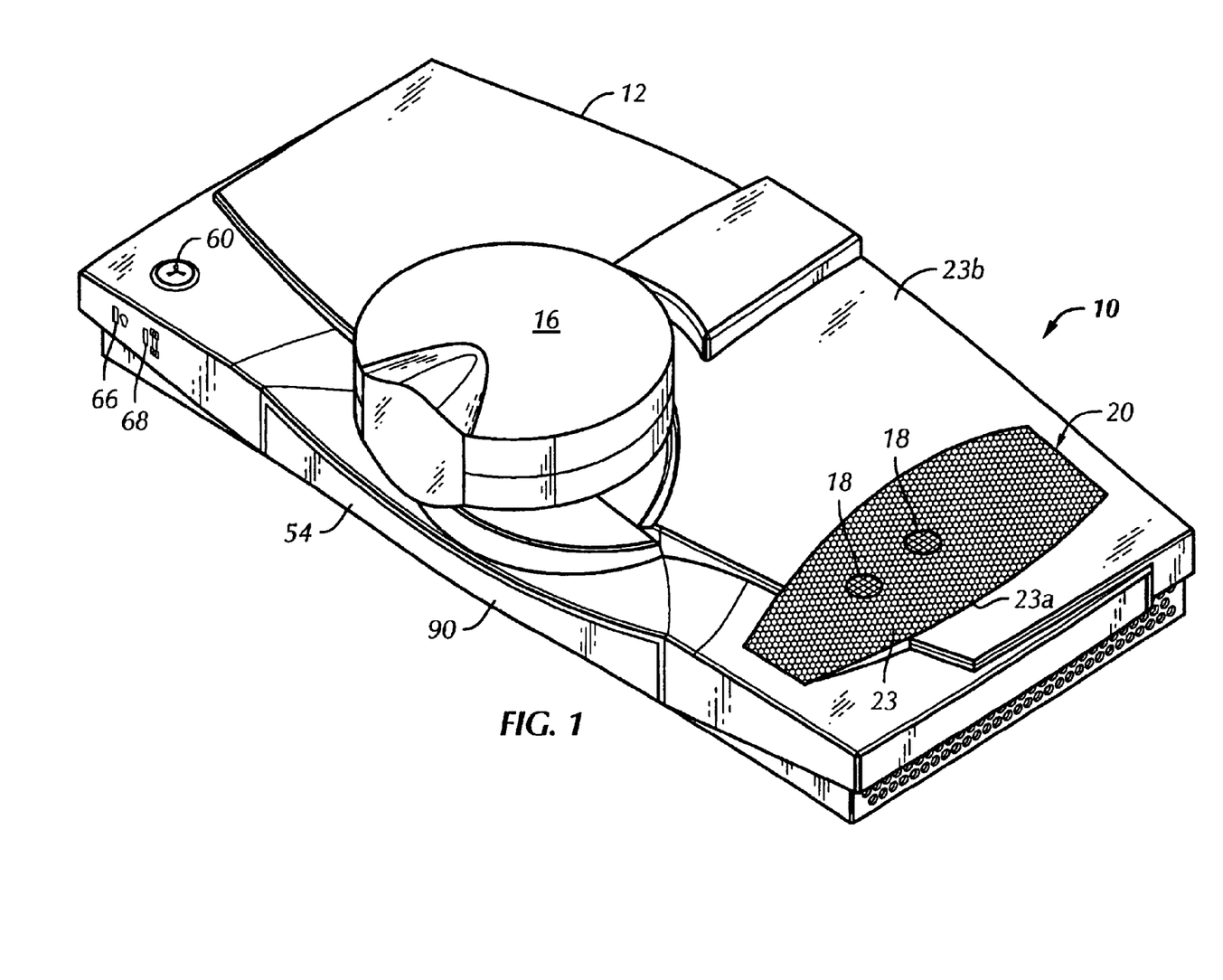
FIG. 1 is a general exterior view of the videoconferencing unit according to the invention.

Referring to FIG. 1, a portable, integrated videoconferencing unit 10 has an integral housing 12 defining an interior space 13 (FIG. 2) in which the electronics and other components necessary to enable a videoconferencing activity can be housed and/or mounted. The videoconferencing unit 10, therefore, can be connected to an appropriate telecommunications channel 22, for example an ISDN line, a Dialup 56 kbs line, one or more T1 channels, a standard telephone line (POTS), or a packet switched network, and to a video monitor 15 (FIG. 3) which can be either a specially designed monitor without audio capability (in which case additional speaker capability within the integrated unit 10 or associated with the monitor is needed) or a television receiver to which the necessary video and audio signals are provided, and whereby a videoconference can be quickly set up.

Figure 3:
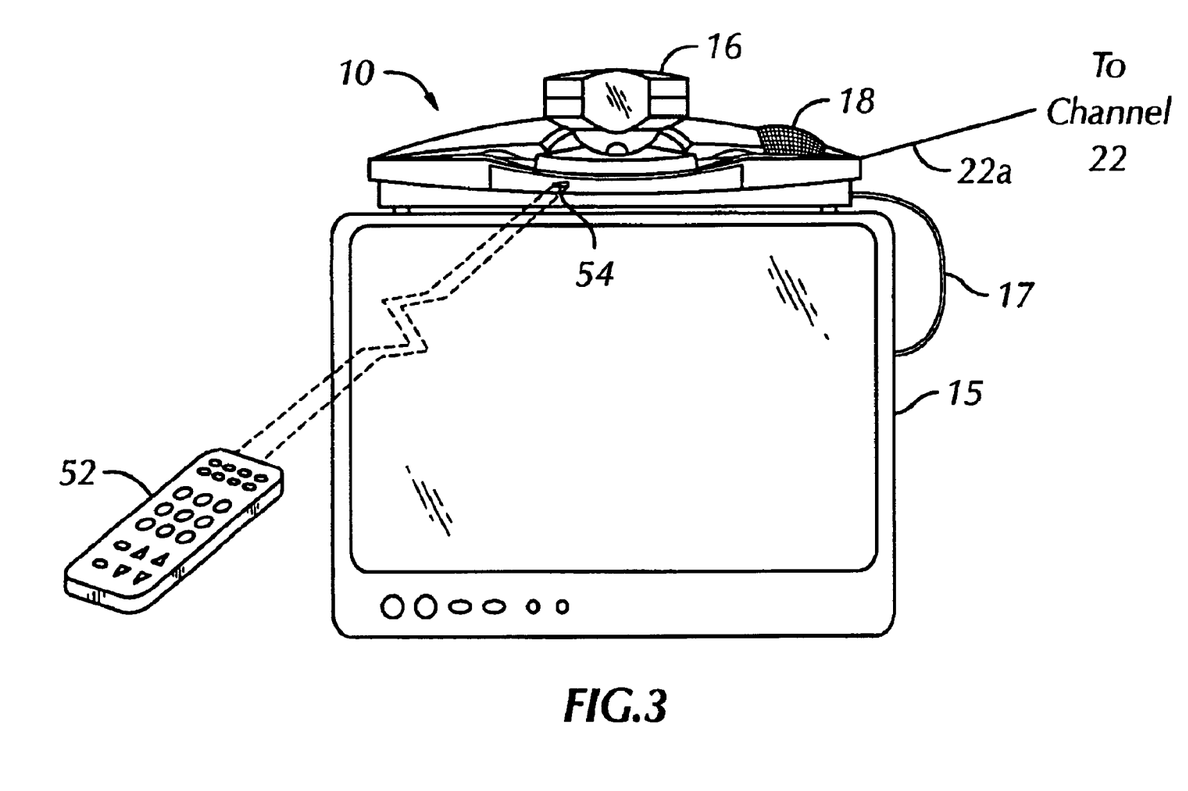
FIG. 3 is a view of the videoconferencing unit in accordance with the invention wherein the conferencing unit sits atop a video monitor.
Figure 4:
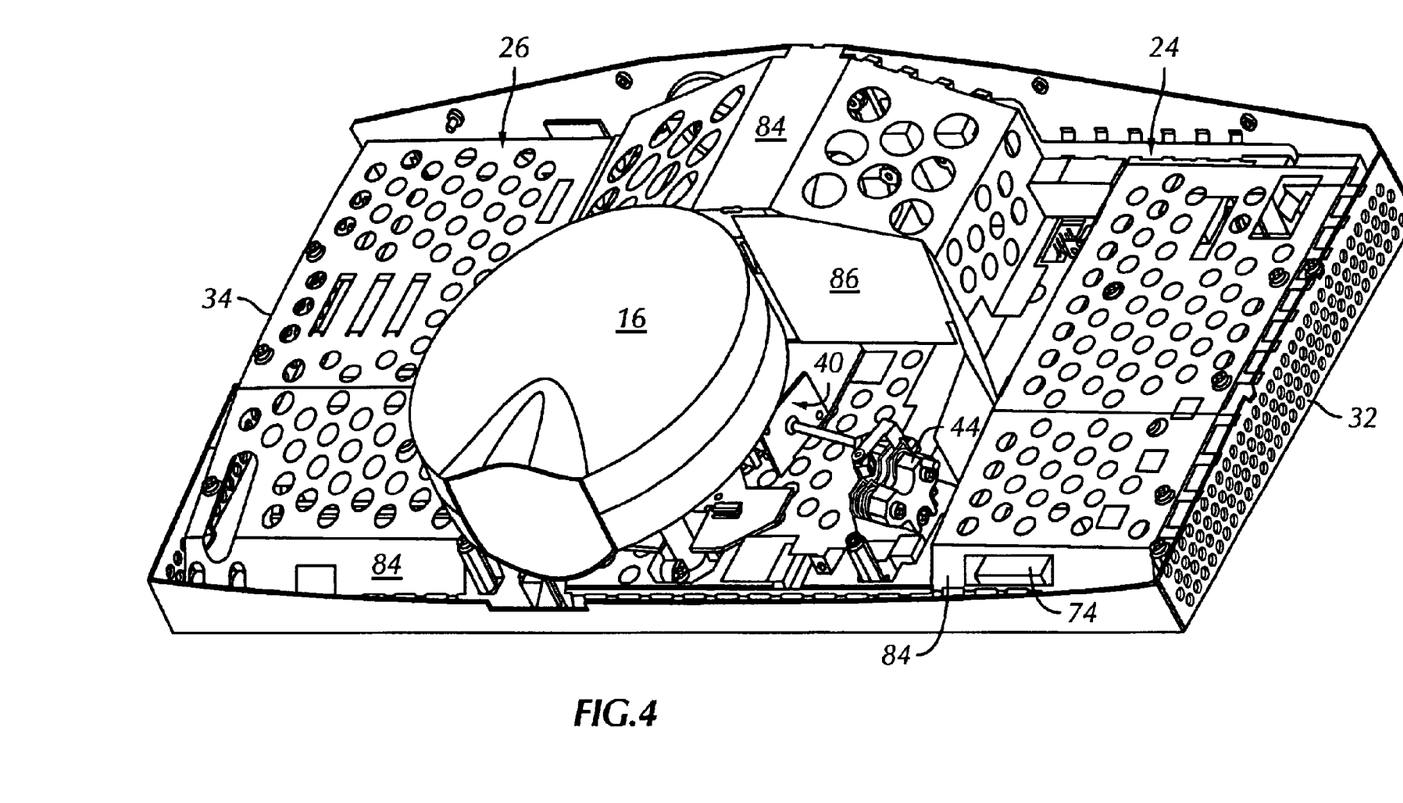
FIG. 4 is another top view of the interior of the videoconferencing unit in accordance with the invention.

The videoconferencing unit 10 is preferably designed to fit in a briefcase style package so that it can be transported easily from location to location, can be placed beneath the seat or stored overhead in an airplane, and generally enables the user to take the videoconferencing equipment with him. At the video site, referring to FIG. 3, the videoconferencing unit 10 can be set up positioned on top of the video monitor 15, connected to the video monitor over a cable 17, and connected to the communications channel 22 over a line 22a. As illustrated in FIGS. 1 and 3, the videoconferencing unit 10 further includes a video camera 16 and at least one microphone 18.

The videoconferencing unit 10 houses an electronics board 14 within the interior space 13 (see FIG. 2) with the electronics board performing video and audio processing, as well as enabling the communications to and from a telecommunications channel. In the illustrated embodiment, the electronics board is a single board, however in other embodiments of the invention a plurality of boards may be used. The videoconferencing unit video camera 16, preferably one which has pan and tilt functions, is mounted on the housing at a post 19. Camera 16 provides a video output over a line 21 which is connected to the electronics board. The videoconferencing unit in the illustrated embodiment has at least one microphone 18 mounted on the housing and having an audio output connected to the electronics board. In the preferred and illustrated embodiment of the invention, three microphones 18 are provided which together form a directed array 20 using an associated audio processing circuit 23 to provide an enhanced audio output from the audio unit, as described in U.S. Ser. No. 08/657,636, filed May 30, 1996, the contents of which are incorporated herein, by reference. The output of the audio acquisition system (microphones 18 and circuit 23) is connected to the electronics board for processing. The videoconferencing unit also has the capability of receiving externally generated video and audio signals, for example, from a video tape recorder, through, for example, connectors mounted on the rear of the housing. (In the illustrated embodiment, the microphones 18 and circuitry 23 are positioned beneath grill 23a on the top cover section 23b.)

The electronics board, which is comprised of a large number of electronic components and processors, receives and processes the video output from camera 16 and the audio output from the microphone array 20 and circuit 23, and generates a compressed video output signal and a compressed audio output signal for transmission over the communications channel 22. The compressed signal preferably meets at least one of the ITU H series standards (for example, H.320, H.323, H.324, etc.) so as to be compatible with any other video conferencing unit operating according to that standard. The video output is typically sent to a transmission medium, for example an ISDN line, for transmission to a distant location. In other instances, other high-speed digital or analog communications lines 22 can be employed.

In other aspects, if the electronics board is configured to provide compressed video and audio data for output over the direct dial telephone network (POTS), then the system will provide a lesser signal quality due to the more restricted bandwidth of the communications channel. On the other hand, POTS is available at substantially every location (ISDN and other high speed digital channels must have been previously and specially installed) and hence greater access is possible over the POTS line.

The electronics board also receives from the communications channel 22 video conferencing signals representing compressed video and audio from a far end unit. These videoconferencing signals are decompressed by the electronics board to generate decompressed far end audio and video signals. The decompressed audio signals are either sent to a speaker system which is part of the video monitor for appropriate playback, or are combined with the video signals and sent to the video monitor as a single NTSC signal, that is, as a combined video and audio signal. The video monitor can thus be a television receiver in which case the video and audio signals can be separately provided (as from a video tape player) or can be combined into a standard NTSC signal for playback over, for example, channel 3 of the television receiver. The communications channel 22 connects to the housing 12 for electrical connection to the electronics board.

Figure 2:
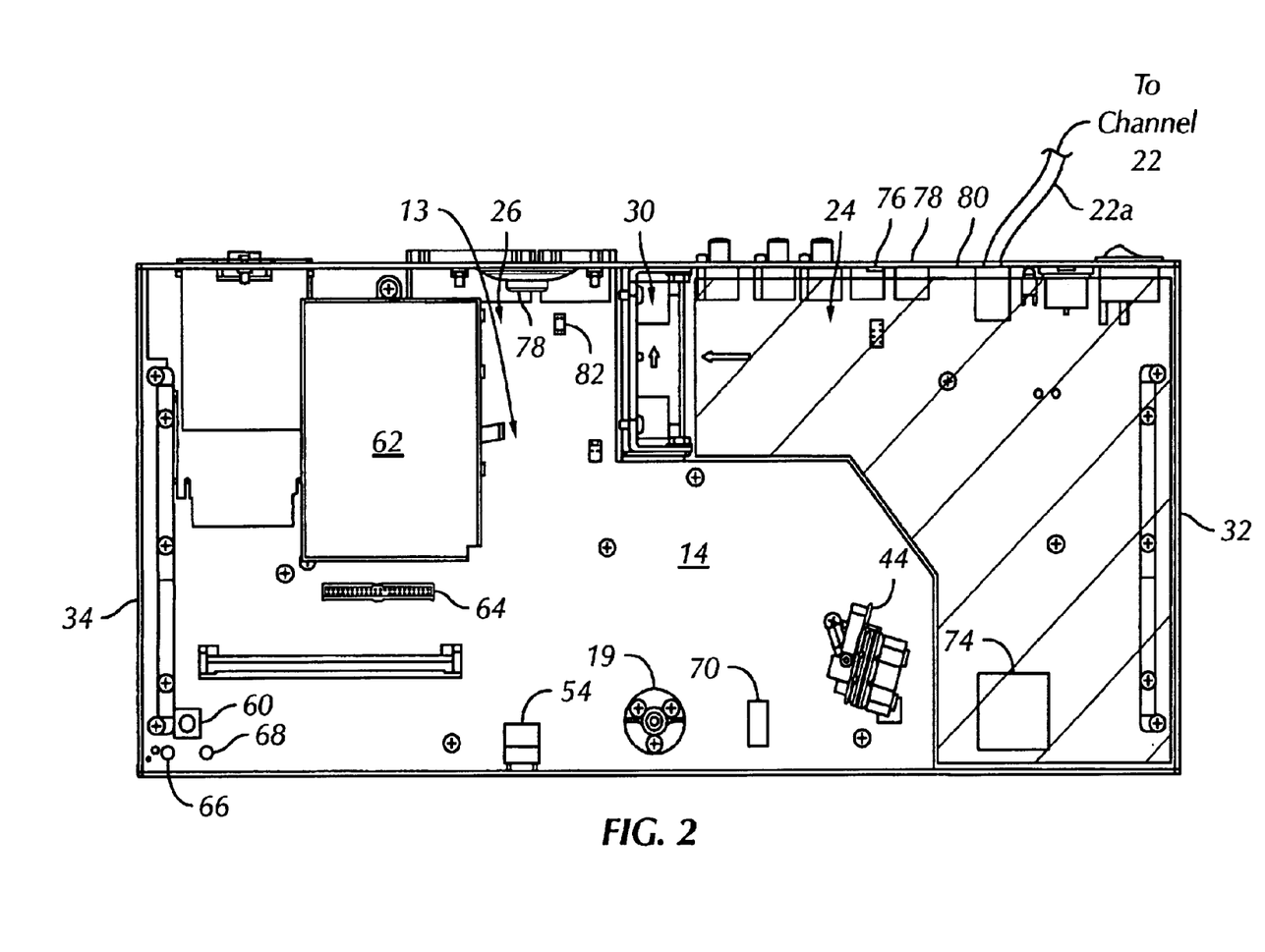
FIG. 2 is a top perspective view of the interior of the videoconferencing unit with the electronics board in place, in accordance with the invention.

Referring now to FIG. 2, the electronics board 14 is rigidly maintained within the interior space 13 of the housing 12. Preferably, interior space 13 has at least two compartments 24 and 26. In the preferred embodiment of the invention, these compartments must be air cooled since, as the electronics become more densely packed on the electronics board 14, the need to cool the electronics increases. In the illustrated embodiment of the invention, however, since the microphones 18 are an integral part of the videoconferencing unit 10 and are integral to and mounted on the housing 12, vibration and noise from fan operation can severely impact the quality of the audio signal being received, to the extent of rendering unacceptable, the signal to noise ratio of the signal. Thus, to minimize the effect of both noise and vibration on the microphones 18, the fan is mounted interiorly and rearwardly in the housing, to separate the fan from the microphones physically and acoustically.

Thus, a cooling fan 30 is mounted at an interior location of the housing, and in the illustrated embodiment, is mounted between compartments 24 and 26 to effect air flow from one compartment to the other. Each compartment is itself substantially air tight (although some leakage will occur, for example, as illustrated in FIG. 2) except for openings to the ambient environment. Thus, operation of the fan 30 causes ambient air to be brought into one compartment, compartment 24 in the illustrated embodiment, through a side wall 32, and passed through compartment 24 to the other compartment 26 from which it exhausts to the ambient environment through a side wall 34. The fan itself, in addition to being a low noise fan, is mounted especially to minimize and eliminate the transfer of any vibrational motion to the housing itself, and further to provide sound insulation between the fan and the microphones. In this manner, the microphones are both mechanically and acoustically insulated from the fan, and noise from the fan, relatively loud and unshielded in its normal exterior position wherein it is mounted to directly communicate through a side wall of the housing, is substantially reduced or eliminated.

Figure 2A:
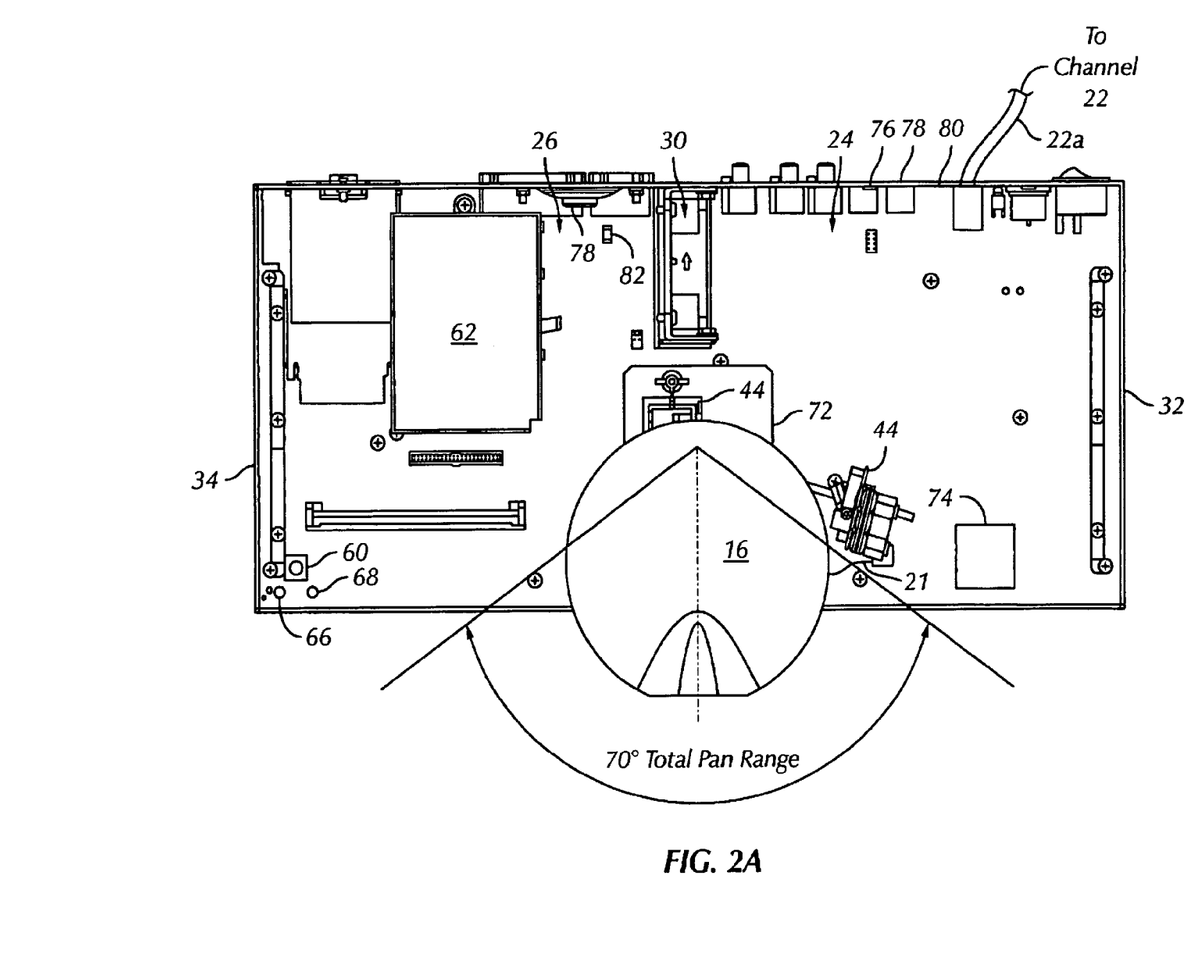
FIG. 2A is a top plan view of the interior of the videoconferencing unit with the electronics board and camera in place, in accordance with the invention.
Figure 2B:
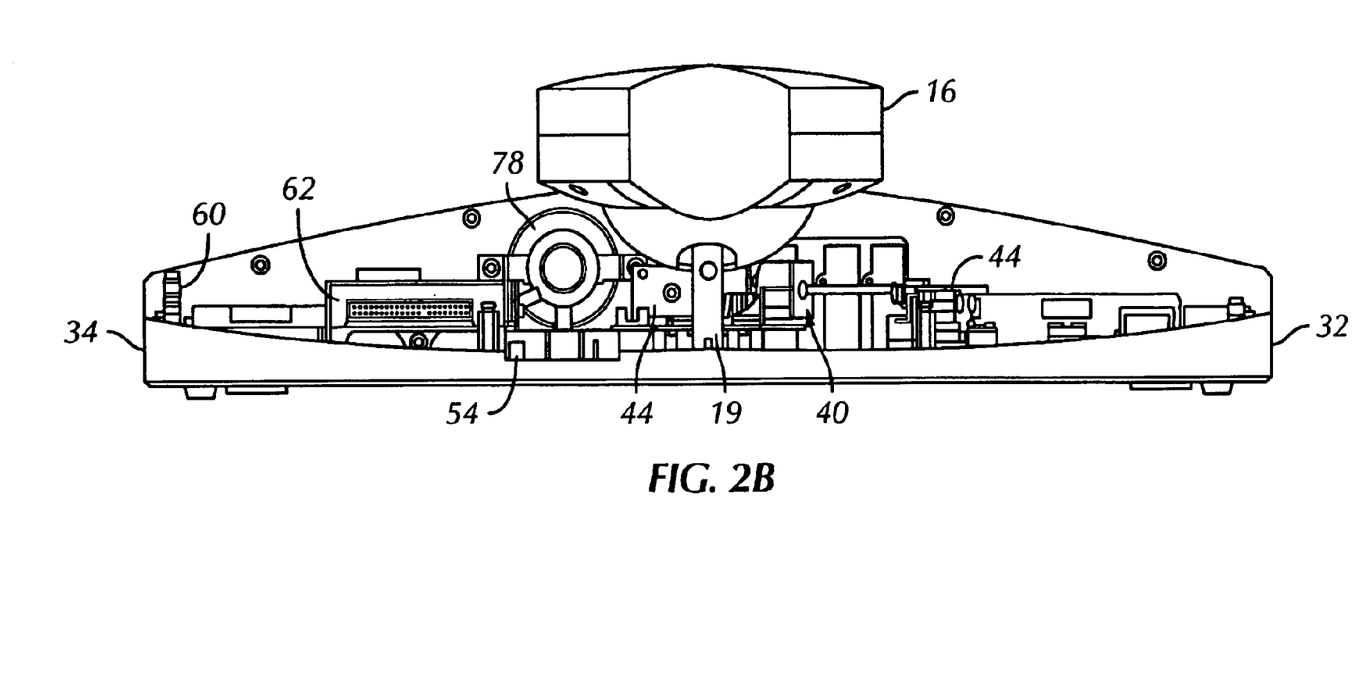
FIG. 2B is a front elevation view of the assembly of FIG. 2A.

The housing also, as illustrated in particular in FIGS. 2 and 2A, mounts the video camera 16 at post 19. The video camera, when in operation, could create noise and vibration since it is a relatively heavy object being moved, in the illustrated embodiment, in both the pan and tilt axes. Accordingly, a worm drive design 40 driven by quiet and shock mounted motors 44, both, known for low vibration and noise, are used for effecting pan and tilt motion of the camera thus reducing both noise and vibration pick-up by the microphone array.

In another aspect of the integrated videoconferencing unit, referring to FIG. 3, a remote control, infrared system is implemented, as is well known in the art. The infrared remote control system enables a user, located at a distance from the videoconferencing unit itself, to control the audio and video functions of the unit from a hand-held remote control console 52. This is similar to the control unit used with room conferencing systems such as those sold by PictureTel Corporation of Andover, Mass. A receptor 54, mounted in the front of unit 10, connects to the electronic board 14 for controlling various operations of the system.

The hand-held remote control device 52, however, can often be mislaid, temporarily, especially in a room setting with substantial paper and other elements as opposed to a conference room setting which is kept relatively clear. To alleviate the need to immediately find the remote control unit to answer a call, while preserving the ability to selectively screen incoming calls, the integrated videoconferencing unit 10 has an activation answer device 60 mounted integrally on the housing top surface to enable the user to screen incoming calls and to answer them without having to locate the remote control unit. Thus, by depressing device 60 which is accessible from the top front of the unit, a call can be "picked up" even before all of the controls desirable to handle the call have been located. This activation element, typically a pushbutton, is electrically connected to the electronic board which will answer the call upon activation of the pushbutton.

Mechanically, referring to FIGS. 2, 2A, 2B and 4, the electronic board 14 is a printed circuit board designed to fit across the entire "floor" or pan of the videoconferencing unit. The circuit board is notched to fit around the fan. On top of the electronics board is mounted a hard disk drive 62 connected to a connector 64 on the board through a flexible ribbon cable (not shown), the answer device 60, two LEDs 66, 68, indicating "power on" and "call-in-process", a connector 70 for connecting the electronics board to the camera electronics 72, a connector 74 for interfacing and connecting to the microphone electronics, and a connector 76 for connecting to the external video and audio. In addition, a speaker 78 is mounted in the back side wall 80 and connects at a connector 82 on the electronics board. Once the connections are in place, and the camera is mounted on camera post 19, EMI shielding 84 (FIG. 4) and a thermal barrier 86 is provided to complete the interior chamber configuration. In this process, the motor control connects through motors 44 to effect the pan and tilt motion for the camera. One motor and the camera electronics 72, rotate with the camera and connect through flexible wiring to connector 70.

In order to reduce noise and vibration, motors 44 are mounted on vibration absorbing polypropylene through a so-called living hinge mounting process. In a similar manner, the hard drive is mounted to isolate it from the rest of the system with regard to both noise and vibration.

Since the compartments 24 and 26 are not "airtight", and since ambient air intake is primarily in compartment 24, most of the electronics requiring substantial cooling are located in compartment 24 which receives the cooler air from the ambient atmosphere. The fan then moves this air from compartment 24 through compartment 26 and exhausts through side wall 34. The top cover is then placed on the assembly and a front bezel 90 is added to complete the unit. Infrared receiver 54 is located in the front of the videoconferencing unit behind the infrared transparent bezel.

Figure 5:
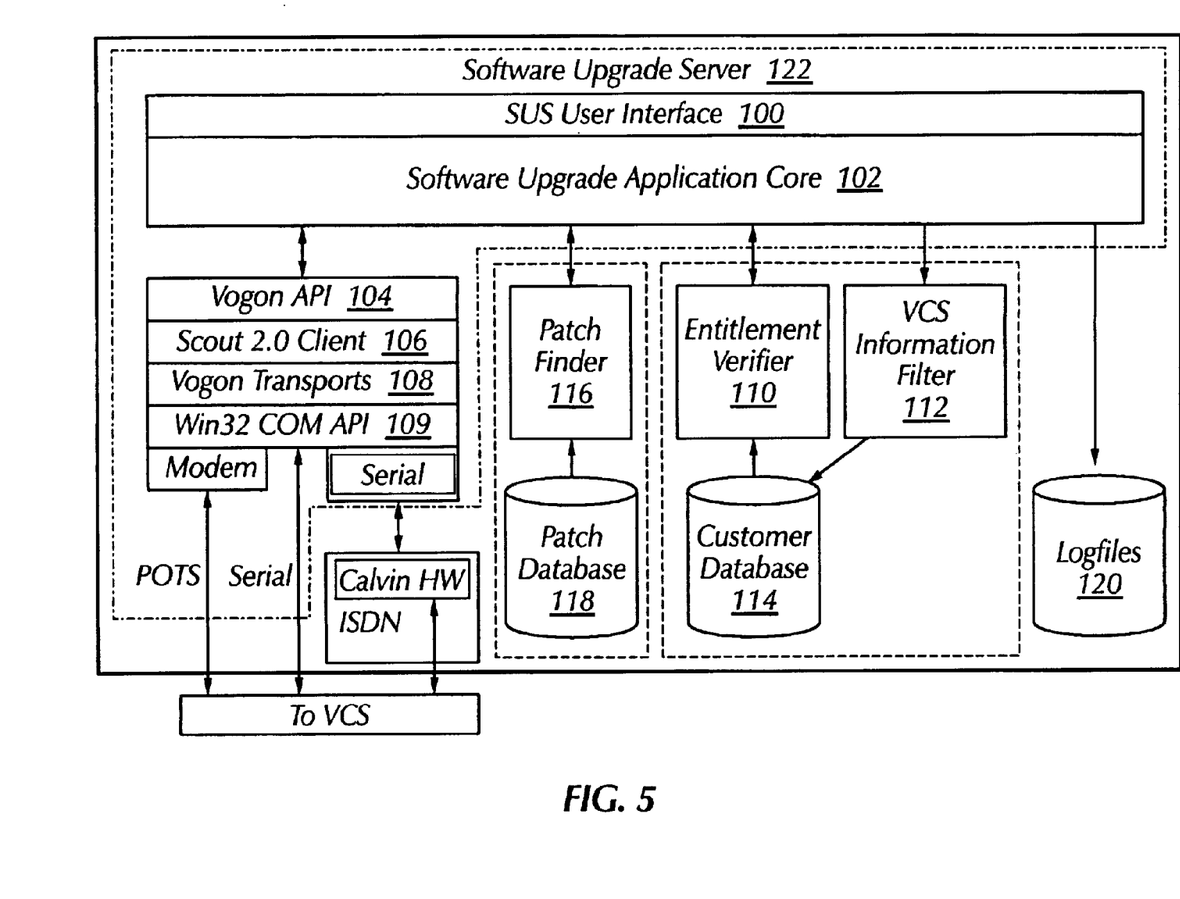
FIG. 5 is a high level illustration of the software at an upgrade server in accordance with the invention.

In order to enhance the portability of the videoconferencing unit 10, and to enable it to remain "state of the art", the software programs which enable the functioning of the videoconferencing unit 10 can be upgraded by a videoconference call to a distant upgrade server. Referring to FIG. 5, in a high level view of the design of the server, the server software has a plurality of operating layers, and includes user interface 100, a software upgrade application core 102, a remote software Application Programmer's Interface 104, a remote software client server 106, a remote transport software 108, a Win32 communications Application Programmer's Interface (COM API) 109, an entitlement verifier 110, a videoconferencing system information filter 112, a customer database 114, a patch finder 116, a patch database 118, logfiles 120, and a link to the communication channels 22 which as noted above, can include POTS, ISDN, packet switched, or other serial ports. Together, all of these components identify the software upgrade server 122. This server manages the upgrading of videoconferencing systems that call into it without user intervention.

Figure 6:
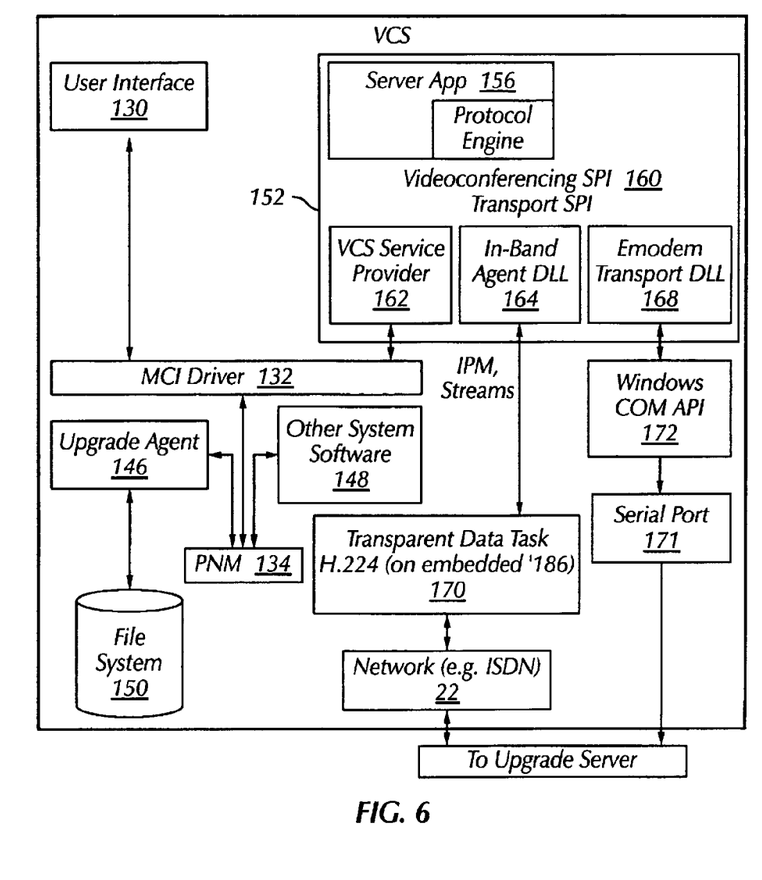
FIG. 6 illustrates a high level view of the software at the video conferencing unit in accordance with a preferred embodiment of the invention.

A high level view of the corresponding software design for the videoconferencing unit 10 is illustrated in FIG. 6. Accordingly, the layered software of the videoconferencing unit 10 includes a user interface 130, an MCI driver 132, a PNM 144, an upgrade agent 146, system software 148, a file system 150, and the software core program 152. The software core program includes a server application and protocol engine 156, a videoconferencing SPI 158, a transport SPI 160, a VCS service provider 162, an in-band agent 164, and an EModem Transport DLL 168. These elements communicate with the transparent data task of H.224 (170) which in turn communicates with the network to the software upgrade server. This can also be performed through a serial port communication 171, through a Windows COM API 172 from the server application as illustrated in FIG. 6.

Figure 7:
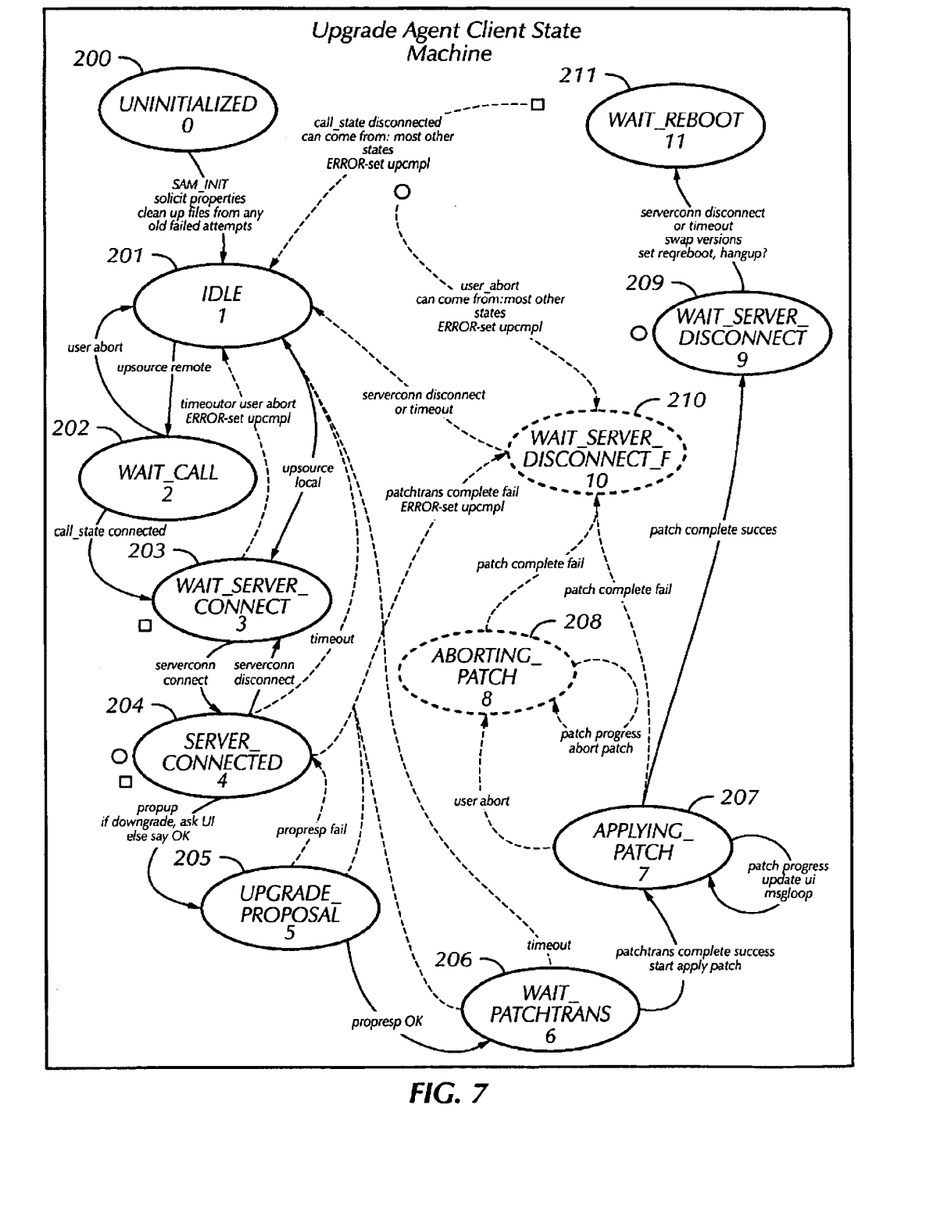
FIG. 7 is a state diagram at the videoconferencing unit of the software upgrade operation.

Referring now to FIG. 7, the upgrade agent client can be viewed as a state machine. The system thus drives the logic in the videoconferencing system when it is in a "videoconference" with the upgrade server. Referring therefore to FIG. 7, the upgrade client starts in an uninitialized state 200 and moves to idle state 201 during system initialization, where it remains for normal videoconferencing. The state machine begins the remote upgrade operation when it receives the upsource remote command, which is initiated through the remote control 52 and an on-screen menu. In the normal operation, the state machine transitions through the following states, in order: wait for call 202, wait for connection 203, connected 204, proposal 205, wait for patch transfer 206, applying patch 207, wait for disconnect 209, and wait for reboot 211. Other transitions can occur due to errors or an abort command initiated by the user.

In state 202, the upgrade client waits for completion of the call to the upgrade server. An abort command sends it back to state 201. When the call is complete, in state 203, the client waits for the server to begin communication. An error event sends it back to state 201. Once the server is connected, in state 204, the client waits for an upgrade proposal from the server. An error event sends it to state 210 or 201. The server makes the proposal, which puts the client in state 205. The client now has the opportunity to accept or reject the proposal. Normally, the client will accept the proposal. The client could reject the proposal if, for example the server actually proposed a downgrade instead of an upgrade. If the client rejects the proposal, it goes back to state 204. If it accepts the proposal, it moves on to state 206 where it waits to receive the patch file from the server. After the patch file is received, the client applies the patch in state 207. If the patch fails, the client moves to state 210 and then back to state 201. If the user aborts during state 207, the client moves to state 208 then to state 210. If the patch is applied successfully, the client moves to state 209, waits for the server to disconnect, and then moves to state 211 where the system can be rebooted.

Accordingly, the software upgrade can be accomplished without the need of user intervention. The videoconferencing unit 10 is thus truly portable and can be upgraded, simply and easily, during a conference call, not only by a customer engineer, but by any user, simply by dialing the videoconference number of the upgrade server.

Thus, in operation, the video conferencing unit of the claimed invention can be carried to a site, unpacked in substantially short time, and placed atop a video monitor as illustrated in FIG. 3. Connections from the videoconferencing unit to the communications channel and the video monitor are then made, power is provided from an electrical outlet, and the user is ready to initiate or receive a videoconference call. If the user is making a call, he can access the necessary functions through his remote control unit 52 to dial the numbers necessary to initiate a videoconference. If a call is inbound, the user can use the handheld remote control unit 52 to answer the call, can place the unit in an auto-answer mode, or can simply depress the answer device 60 on the main console unit 10. The remote control provides pan and tilt activation of the camera although that is not required since a fixed camera could be used to reduce the cost of the unit.

Additions, subtractions, and other modifications of the invention will be apparent to those practiced in this field and are within the scope of the following claims.

What is claimed is:

1. A portable, integrated videoconferencing unit comprising an integral housing having an electronics containing interior chamber, an electronics board contained within said chamber, said electronics board performing video and audio processing including at least one of initiating or receiving a video conference call, a video camera integrally mounted on said housing and having a video output connected to said electronics board, a microphone assembly having at least one microphone mounted on said housing and having an audio output connected to said electronics board, said electronics board receiving and processing said video output and said audio output and generating a compressed video output signal and a compressed audio output signal for transmission over a communications channel, said electronics board further receiving videoconferencing signals from the communications channel, said videoconferencing signals representing compressed video and audio from a far end unit, and decompressing said compressed video and audio of said videoconferencing signals to generate decompressed far end audio and video signals, a connection integral with the housing for enabling an electrical access to said decompressed video and audio signals, an answer actuation device on the exterior of said housing, said activation device being connected to said electronics board, and said electronics board, in response to activation of said device, connecting to the communications channel to establish a videoconference call, a channel connection integral with the housing for enabling an electrical connection to the communications channel, and an interiorly mounted air movement unit wherein said housing interior chamber has at least two compartments separated by the interiorly mounted air movement unit, said air movement unit mounted for moving air from one compartment to another compartment while not adversely affecting operation of said microphones, and said compartments each being substantially airtight except for at least on ambient air opening in each compartment whereby in operation, said air movement unit causes air cooling of said electronics board.

2. The portable, integrated videoconferencing unit of claim 1 wherein said housing has a size suitable to be stably positioned on top of a video monitor.

3. The portable, integrated videoconferencing unit of claim 1 further wherein said communications channel is an ISDN line and said electronics board has a channel connection for communicating in an ISDN protocol.

4. The portable, integrated videoconferencing unit of claim 1 further wherein said communications channel is a packet switched network, and said electronics board has a channel connection for communicating in a protocol compatible with said packet switched network.

5. The portable, integrated videoconferencing unit of claim 1 further wherein said communications channel is a POTS line, and said electronics board has a channel correction for communicating in accordance with a POTS compatible protocol.

6. The portable, integrated videoconferencing unit of claim 1 further comprising a camera mount for mounting said camera for pan and tilt motion, said camera mounted for substantially silent movement, whereby movement of said camera does not generate sufficient noise to be noticeably objectionable in said videoconference environment.

7. The portable, integrated videoconferencing unit of claim 6 wherein said camera mount includes a worm gear drive for rotating said camera.

8. The portable, integrated video conferencing unit of claim 1 wherein said microphone assembly comprises a directional microphone array having at least three microphones and a microphone electronics board for operating said microphone array.

9. The portable, integrated videoconferencing unit of claim 1 wherein said unit weighs less than 20 pounds.

10. The portable, integrated videoconferencing unit of claim 1 further comprising an infrared communications system for enabling a user, distanced from said videoconferencing unit, to remotely operate said unit.

11. The portable integrated videoconferencing unit of claim 1 further comprising
  means for requesting, during a videoconference call with an upgrade server, a software upgrade,
  means for verifying the eligibility of said unit for said upgrade,
  means for determining the acceptability of an offered software upgrade, and
  means for completing said upgrade during said video call without further user intervention.

12. The portable integrated videoconferencing unit of claim 1 further comprising said electronics board receiving and processing an externally provided video and an externally provided audio signal for generating said compressed video output signal and said compressed audio output signal for transmission over said communications channel.

13. A portable, integrated videoconferencing unit comprising
  an integral housing having an electronics containing interior chamber,
  an electronics board contained within said chamber, said electronics board performing video and audio processing including at least one of initiating or receiving a video conference call,
  a video camera integrally mounted on said housing and having a video output connected to said electronics board, said camera being driven by a worm gear drive for rotating said camera,
  a microphone assembly having at least one microphone mounted on said housing and having an audio output connected to said electronics board,
  said electronics board receiving and processing said video output and said audio output and generating a compressed video output signal and a compressed audio output signal for transmission over a communications channel,
  said electronics board further receiving videoconferencing signals from the communications channel, said videoconferencing signals representing compressed video and audio from a far end unit, and decompressing said compressed video and audio of said videoconferencing signals to generate decompressed far end audio and video signals,
  a connection integral with the housing for enabling an electrical access to said decompressed video and audio signals,
  a channel connection integral with the housing for enabling an electrical connection to the communications channel,
  an answer actuation device on the exterior of said housing, said activation device being connected to said electronics board, and said electronics board, in response to activation of said device, connecting to the communications channel to establish a videoconference call, and
  said housing interior chamber having, a first compartment having an air inlet for ambient air and an air outlet, a second compartment having an air inlet and an air exhaust to ambient air, and an air movement unit having an air inlet connected to the air outlet of the first compartment and an air outlet connected to the air inlet of the second compartment whereby in operation, said air movement unit causes air cooling of said electronics board.

14. A portable, integrated videoconferencing unit comprising an integral housing having a front portion, a rear portion, and an electronics containing interior chamber,
  an electronics board contained within said chamber, said electronics board performing video and audio processing including at least one of initiating or receiving a videoconference call,
  a video camera integrally mounted on said housing and having a video output connected to said electronics board,
  a camera mount for mounting said camera for pan and tilt motion, said camera mounted for substantially silent movement, whereby movement of said camera does not generate sufficient noise to be noticeably objectionable in said videoconference environment,
  a microphone assembly having at least one microphone mounted on said housing proximate said front portion and having an audio output connected to said electronics board,
  said electronics board receiving and processing said video output and said audio output and generating a compressed video output signal and a compressed audio output signal for transmission over a communications channel,
  said electronics board further receiving videoconferencing signals from the communications channel, said videoconferencing signals representing compressed video and audio from a far end unit, and decompressing said compressed video and audio of said videoconferencing signals to generate decompressed far end audio and video signals,
  a connection integral with the housing for enabling an electrical access to said decompressed video and audio signals,
  a channel connection integral with the housing for enabling an electrical connection to the communications channel,
  an answer actuation device on the exterior of said housing, said activation device being connected to said electronics board, and said electronics board, in response to activation of said device, connecting to the communications channel to establish a videoconference call, and
  said housing interior chamber having a first compartment having an air inlet for ambient air and an air outlet and being otherwise substantially airtight, a second compartment having an air inlet and an air outlet to ambient air and being otherwise substantially airtight and an air movement unit proximate said rear portion and having an inlet and an outlet said air movement unit inlet being connected to the air outlet of the first compartment and said air movement unit outlet being connected to the air inlet of the second compartment, whereby in operation, said air movement unit causes air cooling of said electronics board, and
  an infrared communications system for enabling a user, distanced from said videoconferencing unit to remotely operate said unit.

* * * * *